(12) United States Patent
Urmanov et al.

(10) Patent No.: US 10,491,630 B2
(45) Date of Patent: Nov. 26, 2019

(54) SYSTEM AND METHOD FOR PROVIDING DATA-DRIVEN USER AUTHENTICATION MISUSE DETECTION

(71) Applicant: ORACLE INTERNATIONAL CORPORATION, Redwood Shores, CA (US)

(72) Inventors: Aleksey M. Urmanov, San Diego, CA (US); Alan P. Wood, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/211,819

(22) Filed: Dec. 6, 2018

(65) Prior Publication Data

US 2019/0109875 A1 Apr. 11, 2019

Related U.S. Application Data

(63) Continuation of application No. 15/258,135, filed on Sep. 7, 2016, now Pat. No. 10,165,005.

(51) Int. Cl.
*H04L 29/06* (2006.01)
*G06F 17/30* (2006.01)
(Continued)

(52) U.S. Cl.
CPC .......... *H04L 63/1483* (2013.01); *G06F 21/31* (2013.01); *G06F 21/316* (2013.01);
(Continued)

(58) Field of Classification Search
CPC . H04L 63/1483; H04L 63/08; H04L 63/1425; H04L 2463/121; G06F 2221/2101
(Continued)

(56) References Cited

U.S. PATENT DOCUMENTS

2010/0235918 A1* 9/2010 Mizrahi .............. H04L 63/1416
726/25
2014/0143182 A1 5/2014 Urmanov et al.
(Continued)

OTHER PUBLICATIONS

Improving One-Class SVM for Anomaly Detection; Kun-Lun Li; IEEE: 2003; p. 3077-3081.*
(Continued)

*Primary Examiner* — Monjur Rahim
(74) *Attorney, Agent, or Firm* — Kraguljac Law Group, LLC

(57) ABSTRACT

Systems, methods, and other embodiments are disclosed for data-driven user authentication misuse detection. In one embodiment, for a user authentication attempt to access a secure computer resource, user authentication log data having user attribute values is collected. The user authentication log data is transformed into a tracer data structure. The tracer data structure is augmented with timestamp data to generate an event data structure. It is determined whether the tracer data structure matches an existing tracer data structure stored in a rules database and, if not, a novelty flag is set to generate a new user behavior model filter. If the tracer data structure matches the existing tracer data structure: an existing user behavior model filter is applied, issuance of an alarm message or signal is controlled, and the existing user behavior model filter is updated based, at least in part, on the event data structure.

20 Claims, 6 Drawing Sheets

(51) Int. Cl.
*G06F 15/16* (2006.01)
*G06F 21/31* (2013.01)
*G06F 21/55* (2013.01)

(52) U.S. Cl.
CPC ............ *G06F 21/554* (2013.01); *H04L 63/08* (2013.01); *H04L 63/1425* (2013.01); *H04L 63/1441* (2013.01); *G06F 2221/2101* (2013.01); *H04L 2463/121* (2013.01)

(58) Field of Classification Search
USPC .......................................................... 726/7
See application file for complete search history.

(56) References Cited

U.S. PATENT DOCUMENTS

| | | | |
|---|---|---|---|
| 2014/0280146 A1 | 9/2014 | Wood et al. | |
| 2016/0140567 A1* | 5/2016 | Hanna .............. | G06Q 20/40145 705/44 |
| 2016/0285847 A1* | 9/2016 | Oberheide ................ | G06F 9/00 |
| 2016/0371476 A1* | 12/2016 | Turgeman ............. | G06F 21/316 |
| 2017/0070527 A1* | 3/2017 | Bailey ................. | H04L 63/1416 |

OTHER PUBLICATIONS

L. Molodykh et al., "Operating Model of Knowledge Quantum Engineering for Decision-Making in Conditions of Indeterminacy"; International Journal Information Theories & Applications, vol. 14, pp. 74-81, 2007.

Thaddeus Vincenty, "Direct and Inverse Solutions of Geodesics on the Ellipsoid with Application of Nested Equations"; Survey Review, Kingston Road, Tolworth, Surrey: Directorate of Overseas Surveys, 23 (176): pp. 88-93, 1975.

\* cited by examiner

SYSTEM AND METHOD FOR PROVIDING DATA-DRIVEN USER AUTHENTICATION MISUSE DETECTION

BACKGROUND

The security technologies and services market continues to grow as enterprises are challenged as never before in cyber space and invest significantly in protecting their assets and their customers from fraudulent activity. Conventional identity management (IdM) technologies that enterprises use to control user authentication and privileges are becoming more vulnerable to misuse as users access corporate resources from a wider variety of devices, connection types, and geographical locations.

Although enterprises may enforce strict use policies designed to minimize any chances of exposing user account credentials, human factors, technological weaknesses, and inevitable bugs in software and hardware components often allow attackers to obtain user account credentials and exploit them in fraudulent activities.

As an example, a phishing attack is one common attack scenario in which a company's employees receive credible looking emails asking them to click a certain link and perform a certain action requiring entering their username and password. After obtaining a user's password, the fraudulent site may redirect the user to a valid company site, such that the user may not even realize that his/her account credentials have just been stolen.

The only line of defense of current IdM systems against phishing attacks is to couple with a spam detecting software that screens all inbound and outbound emails and recognizes potential phishing emails. Unfortunately some phishing attacks disguise themselves so skillfully that they easily trick general-purpose spam-filtering software into allowing such emails as valid.

Another attack scenario example occurs when employees use weak and duplicate passwords for corporate systems and for other online services. Once attackers gain access to online services, which may have lower security standards, they use the obtained account credentials to access corporate systems. It is almost impossible to detect such password breaches with conventional IdM systems unless the attacker performs readily noticeable, disruptive actions such as resetting the password or using the compromised account in spamming or phishing campaigns.

Despite enterprises' use of sophisticated security solutions, including firewalls, anti-virus and anti-spyware suites, blacklists, spam filters, and so forth, there is a dangerously increasing number of attacks getting through the traditional security measures. Additionally, there are an increasing number of attacks due to the expanding range of opportunities for attackers created by the emerging Internet of Things, the abundance of mobile and wearable devices, and the shift to cloud computing.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
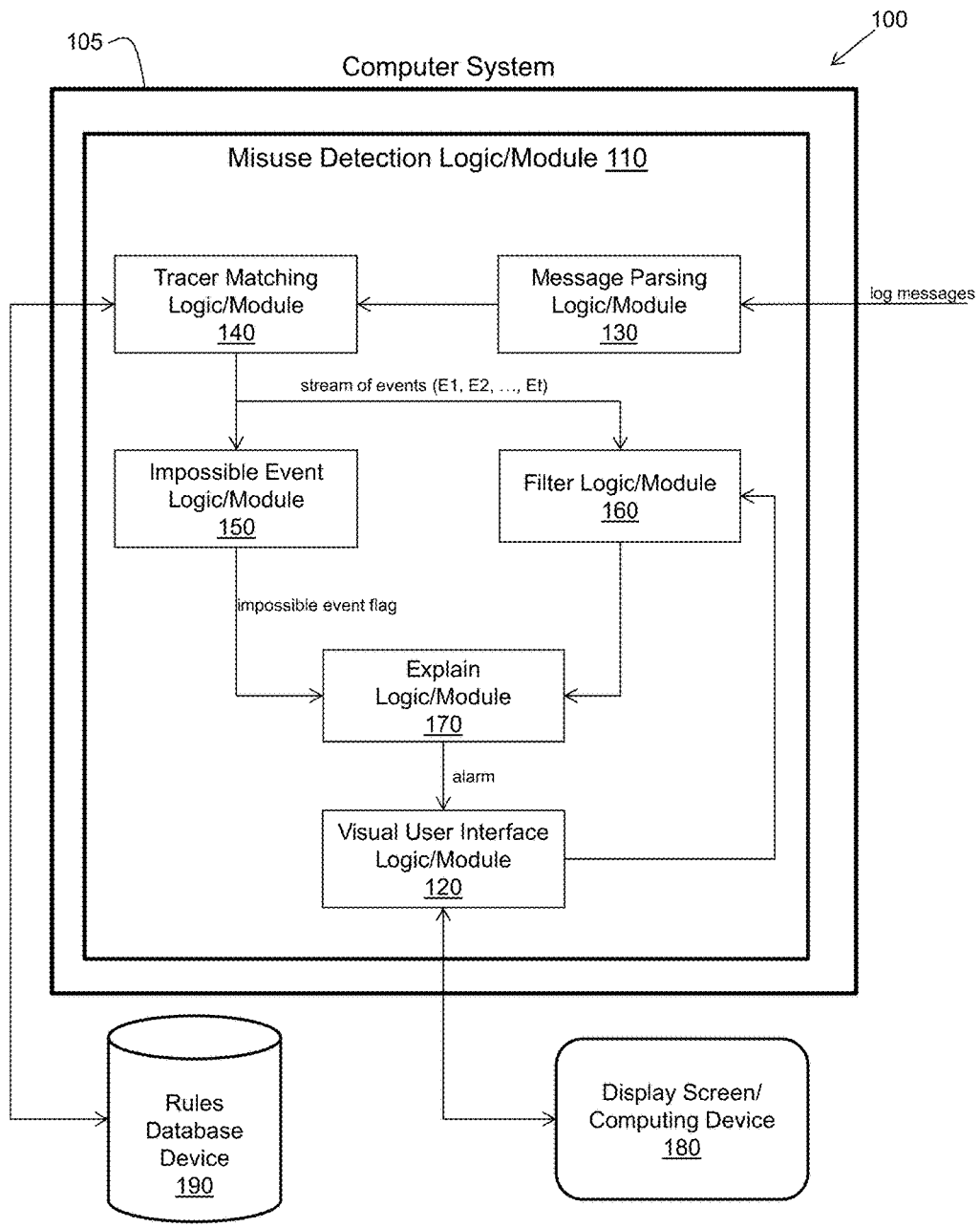
FIG. 1 illustrates one embodiment of a computer system, having a computing device configured with misuse detection logic, providing data-driven user authentication misuse detection.

Computerized systems, methods, and other computerized embodiments are disclosed that provide detection of malicious uses of user accounts. In one embodiment, a system collects user authentication attempts data, transforms the data, augments the data with other data, autonomously builds representations of account use patterns, and detects malicious authentication attempts. When used as part of multifactor authentication process, the disclosed system allows the prevention of malicious activity. The system does not require any training (labeled) data or knowledge of the exact mechanisms used for user authentication misuse. The system is ready to use immediately after installation without the need for an initial training data collection period.

The following terms are used herein with respect to various embodiments.

The term "authentication attempt", as used herein refers to an effort by a person via a computer, or by the computer itself, to be approved to access a user account on another computer.

The term "authentication log message", as used herein refers to a computer message received by a computer, typically over a computer network, where the computer message was sent by a person via another computer, or by the other computer itself, as part of an authentication attempt.

The term "authentication log data", as used herein refers to data contained in an authentication log message.

The term "user attribute", as used herein refers to a type of authentication log data associated with a characteristic of a user attempting to access a user account on a computer. Examples of user attributes include a user name, a client IP address, a resource name, a login status, a timestamp, an authentication scheme, an authentication policy, a partner, a failure code, a retry count, a session, and an authentication level.

The term "user attribute value", as used herein refers to a specific value (e.g., text, numerical, a combination of text and numerical) that a user attribute is assigned or takes on.

The term "account usage pattern", as used herein refers to a recorded representation (e.g., a computerized filter or model) of valid (non-malicious) attempts and malicious attempts by a user to authenticate to a user account on a computer.

Overview

In one embodiment, a method makes it possible to reliably detect malicious attempts to access a user account on a computer system, without using training (labeled) data, by identifying impossible correlations in user authentication behavior. The method is based on first detecting an impossible condition that is not realizable under expected account usage scenarios. Upon, detection of such a condition, rule-based reasoning, called filtering, is used to analyze the impossible condition and either resolve it as normal or flag it as suspicious. The system attempts to rationally explain the impossible event to minimize false alarms, which minimizes use of system and security personnel resources by only responding to infrequent events, thus allowing scaling to hundreds of thousands of users.

In one embodiment, tracking user behavior without labeling is achieved. Although not required, specific user behavior can be identified as suspicious and automatically cause an alarm whenever the suspicious behavior is observed, where the identification can happen in real time.

In one embodiment, data representation of user authentication events by "tracers" that compactly represent the user actions and times is accomplished. If a tracer has appeared before, only the new event time is saved instead of a new tracer. This enables correlation and discovery of patterns of activations of tracers (rule firing times or timestamps). Filters and alarms can be based on tracers for a single user or multiple users.

In one embodiment, the ability to detect malicious use of user authentication data even when the authentications are successful is provided. By observing user authentication behavior over time, the system builds a comprehensive model of each user's behavior. Even if an attacker has the user's ID and password and is able to successfully authenticate, the attacker cannot replicate the user behavior, which will lead to deviations from the model.

In this manner, malicious attempts to access an account of a user on a computer can be detected and thwarted.

DETAILED DESCRIPTION WITH RESPECT TO THE DRAWINGS

FIG. 1 illustrates one embodiment of a computer system 100, having a computing device 105 configured with misuse detection logic 110, providing data-driven user authentication misuse detection. In one embodiment, misuse detection logic 110 may be part of a larger computer application (e.g., a computerized security application), configured to prevent malicious and unauthorized access to user accounts.

In one embodiment, the system 100 is a computing/data processing system including an application or collection of distributed applications for enterprise organizations. The applications and computing system 100 may be configured to operate with or be implemented as a cloud-based networking system, a Software as a Service (SaaS) architecture, or other type of computing solution.

With reference to FIG. 1, in one embodiment, misuse detection logic/module 110 is implemented on the computing device 105 and includes logics or modules for implementing and controlling various functional aspects of misuse detection logic/module 110. In one embodiment, misuse detection logic/module 110 includes visual user interface logic/module 120, message parsing logic/module 130, tracer matching logic/module 140, impossible event logic/module 150, filter logic/module 160, and explain logic/module 170.

Other embodiments may provide different logics or combinations of logics that provide the same or similar functionality, and control of that functionality, as misuse detection logic 110 of FIG. 1. In one embodiment, misuse detection logic 110 is an executable application including algorithms and/or program modules configured to perform the functions of the logics. The application is stored in a non-transitory computer storage medium. That is, in one embodiment, the logics of misuse detection logic 110 are implemented as modules of instructions stored on a computer-readable medium.

The computer system 100 also includes a display screen 180 operably connected to the computing device 105. In accordance with one embodiment, the display screen 180 is implemented to display views of and facilitate user interaction with a graphical user interface (GUI) generated by visual user interface logic 120. The graphical user interface may be used, for example, for controlling user specification of filter parameters associated with filters (e.g., a user behavior model filter) of filter logic 160, as discussed later herein. The graphical user interface may be associated with a misuse detection algorithm and visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 180 may represent multiple computing devices/terminals that allow users (e.g., account users) to access and receive services from misuse detection logic 110 via networked computer communications.

In one embodiment, the computer system 100 further includes a rules database device 190 operably connected to the computing device 105 and/or a network interface to access the rules database device 190 via a network connection. In accordance with one embodiment, the rules database device 190 is configured to store tracer data structures having user authentication attributes organized in a common format. The common format includes user attribute values paired with a corresponding user attribute type.

Referring back to the logics of misuse detection logic 110 of FIG. 1, in one embodiment, visual user interface logic 120 is configured to generate a graphical user interface (GUI) to facilitate user interaction with misuse detection logic 110. For example, visual user interface logic 120 includes program code that generates and causes the graphical user interface to be displayed based on an implemented graphical design of the interface. In response to user actions and selections via the GUI, associated aspects of misuse detection logic 110 may be manipulated.

Referring again to FIG. 1, in one embodiment, the rules database device 190 is configured to store tracer data structures having user attributes values in a common format. In one embodiment, user authentication log data from an authentication log message of an authentication attempt is transformed into a tracer data structure. The tracer data structure includes multiple user attribute values (parsed from the authentication log data). Each user attribute value is paired with a corresponding attribute type (i.e., in the common format). A user attribute value may correspond to a user name value, a client IP address value, a resource name value, a login status value, a timestamp value, an authentication scheme value, an authentication policy value, a partner value, a failure code value, a retry count value, a session value, and an authentication level value. Other types of user attribute values are possible as well, in accordance with other embodiments.

As users attempt to authenticate to various resources, the details of authentications are being logged and analyzed by the system 100 to identify misuse of user accounts (e.g., exploitation by external hackers or malicious insiders). In one embodiment, message parsing logic 130 is configured to receive authentication log messages from users attempting to authenticate to the computer system 100 to, for example, access a user account. The authentication log messages come from other computers, for example, via network communications (e.g., via the internet).

For each authentication attempt (i.e., for each authentication log message received), user authentication log data is collected by message parsing logic 130 from the authentication log message. User attribute values are parsed from the user authentication log data by message parsing logic 130 such that the user authentication log data is transformed into a tracer data structure having the user attribute values. The tracer data structure is organized in the common format where each of the user attribute values is paired with a corresponding attribute type.

For example, let U={u} denote the set of users. The users u ∈ U are characterized by a finite number of attributes $a_1$, $a_2$, ..., $a_k$. Each attribute a takes values from some finite domain $D_i = \{v_1^i, v_2^i, \ldots, v_{pi}^i\}$. For example, $a_1$ can be "client IP" and take values from $D_1$={10.141.208.37, 10.141.208.38, 10.141.208.43}, $a_2$ can be "resource name" with values from $D_2$={mailapp, orgchartapp, salesapp}, and $a_3$ can be "status" with values from $D_3$={success, fail}.

A tracer is a data structure composed of a number of attribute-value pairs. A tracer may include all k attributes or any subset of them. The following notation is used for a tracer:

$$T=[a_1=v_j^1:a_2=v_l^2:a_3=v_s^3],$$

and has the following interpretation: attribute value $v_j^1$ is observed for attribute type $a_1$, value $v_l^2$ is observed for attribute type $a_2$, and value $v_s^3$ is observed for attribute type $a_3$. Message parsing logic 130 parses the received authentication log message and creates a tracer data structure T representing the log message.

In one embodiment, for each authentication attempt (i.e., for each authentication log message received), tracer matching logic 140 is configured to attempt to match the tracer data structure to an existing tracer data structure stored in the rules database device 190. An organization of the rules database structure is discussed later herein with respect to FIG. 4 and FIG. 5.

When a matching tracer data structure is found in the rules database device 190, tracer matching logic 140 is configured to update a list of timestamps (firing times) associated with the tracer data structure in the rules database device 190 with a new timestamp (a new firing time). Timestamp data represents a time at which the user authentication log data is observed by the computer system 100 (e.g., observed by message parsing logic 130).

When a matching tracer data structure is not found in the rules database device 190, tracer matching logic 140 is configured to create and store a new tracer data structure in the rules database device 190. Tracer matching logic 140 is also configured to set a novelty flag associated with the new tracer data structure, and set a first timestamp in a list of timestamps associated with the new tracer data structure, in accordance with one embodiment.

In one embodiment, tracer matching logic 140 is also configured to generate an event data structure by augmenting the tracer data structure with timestamp data. Again, timestamp data represents a time at which the user authentication log data is observed by the computer system 100 (e.g., observed by message parsing logic 130). An event data structure E includes a tracer T and a timestamp t such that E={T, t}. The event data structure E indicates that the values of attributes specified by tracer T have been observed at time t.

A user (whether valid or malicious) may attempt to authenticate to the computer system many (e.g., one hundred) times in a row, resulting in a sequenced stream of event data structures $E_1, E_2, \ldots, E_t$ being generated by and output from tracer matching logic 140. In one embodiment, impossible event logic 150 is configured to receive the sequenced stream of event data structures $E_1, E_2, \ldots, E_t$ from tracer matching logic 140 and detect an impossible event pattern within the authentication log messages by analyzing the sequenced stream of event data structures $E_1, E_2, \ldots, E_t$ for the multiple authentication attempts.

In accordance with one embodiment, the impossible event pattern is a hypersonic travel pattern. The hypersonic travel pattern describes a situation in which the speed of travel of a user to physically authenticate from distant geographical locations is greater than the speed of sound traveling in air. Based on IP addresses used in two consecutive authentication events, the geographical location of the user is determined. The geographical location is then converted into latitude and longitude values.

The distance between two locations is computed using the great-circle distance or the Vincenty formula applied to a sphere. When a hypersonic pattern is detected (i.e., the time between two consecutive authentication events is less than the time required to travel the distance between the two locations at the speed of sound), impossible event logic 150 flags the event as being impossible. In one embodiment, impossible event logic 150 sends an impossible event flag to explain logic 170. The detection of other types of impossible events may be possible as well, in accordance with other embodiments.

In one embodiment, filter logic 160 is configured to receive the sequenced stream of event data structures $E_1, E_2, \ldots, E_t$ from tracer matching logic 140. Filter logic 160 is also configured to detect a change in behavior of a user by applying a user behavior model filter, representing account usage patterns of the user, to the sequenced stream of event data structures $E_1, E_2, \ldots, E_t$ for the multiple authentication attempts. An example embodiment of a user behavior model filter is discussed herein with respect to FIG. 3. Explain logic 170 is configured to engage filter logic 160 in an attempt to explain impossible events detected by impossible event logic 150, in accordance with one embodiment, as discussed later herein.

Filter logic 160 may also (or alternatively) employ other types of filters for the purpose of being engaged by explain logic 170 to explain observed impossible events in a sequenced stream of event data structures. For example, in one embodiment, filter logic 160 includes a novelty filter or novelty detector. When a user has never used a specific IP to access a specific resource, the novelty filter is configured to mark the IP as novel, or mark the combination of IP and resource as novel when the IP itself is not novel but was used for the first time to authenticate to the given resource. In one embodiment, the novelty filter can be denoted as $B_{novelty}(F_t)$ with values from {new, used}, where $F_t$ corresponds to a feature associated with user characteristics.

In another embodiment, filter logic 160 includes a blacklist filter. A blacklist filter may be associated with a certain attribute or attributes. For example a blacklist of IPs can be used to determine if the current IP is a known malicious IP or an IP noticed in previous malicious activities, or an IP from a high risk network block. In one embodiment, a blacklist filter can be denoted as $B_{blacklist}(F_t)$ with values from {listed, notlisted}.

In another embodiment, filter logic 160 includes a pattern filter for a customer support activity. For example, determining if other IPs from the same network block were used by the user to access specific resources could indicate normal activity. In one embodiment, a pattern filter can be denoted as $B_{support}(F_t)$.

Other types of filters may be employed by filter logic 160, in accordance with other embodiments, and serve as examples which do not limit the variety of filters that can be used for explaining impossible events. In some embodiments, filters may be configured in filter logic 160 with respect to determining the following:

Incomplete geographical location of the IP
IP-based location change within same country
Company owned IP to company owned IP
Company private IP to company private IP
Company VPN IP to company VPN IP
User behavior change or/and anomaly
IPs previously used by user
IPs in user's country of residence
IPs from whitelists
IPs from blacklists
Customer support-like patterns meaning normal activity Again, in accordance with one embodiment, explain logic 170 is configured to engage filter logic 160 in an attempt to explain impossible events detected by impossible event logic 150. Explain logic 170 is configured to engage filter logic 160 to determine a valid explanation for the impossible event pattern detected by impossible event logic 150, and generate a corresponding valid explanation message. When a valid explanation cannot be determined by explain logic 170, explain logic 170 is configured to generate an alarm message or signal indicating a malicious authentication attempt. Therefore, when an impossible event pattern is detected by impossible event logic 150, the explain logic is engaged. When the impossible event pattern passes an appropriate set of filters of filter logic 160, which could be any or all of the filters, the pattern is explained, and the event is not flagged. When the pattern cannot be explained, the event is flagged, and an alarm is sent (e.g., transmitted via network communications) to, for example, a third party computer.

Explain logic 170 implements the conditions and interoperability of various filters and may include logical and functional operations and various combinations of those. A flagged event may be sent for further analysis, in accordance with one embodiment. In a variation embodiment, a group of security personnel may take further action to investigate the incident. In still another variation embodiment, a flagged event can be reported through an existing security information and event management (SIEM) system. In yet another variation embodiment, multifactor authentication may be automatically employed.

In another variation embodiment, the flagged event can be further analyzed and can be confirmed or cleared. If the event is confirmed, the corresponding user behavior states may be labeled as compromised. If the user transitions from an unlabeled state to a compromised state, a flag can be raised immediately regardless of the presence or absence of an impossible event pattern.

In this manner, misuse detection logic 110 of the computer system 100 of FIG. 1 provides a data-driven approach to user authentication misuse detection. As users attempt to authenticate to various resources, the details of authentication attempts are being logged and analyzed by the system 100 to identify misuse of user accounts (e.g., exploitation by external hackers or malicious insiders). The system 100 processes a stream of features by detecting impossible events, applying filters to explain the observed impossible events, and alarming on impossible events that could not be rationally explained. One of the filters can be a user behavioral change and anomaly detection filter (see FIG. 3), for example. The system 100 can be used as a stand-alone security application that flags suspicious accounts for an in-depth investigation, and can also be used as a trigger for multi-factor authentication or other preventive measures.

Figure 2:
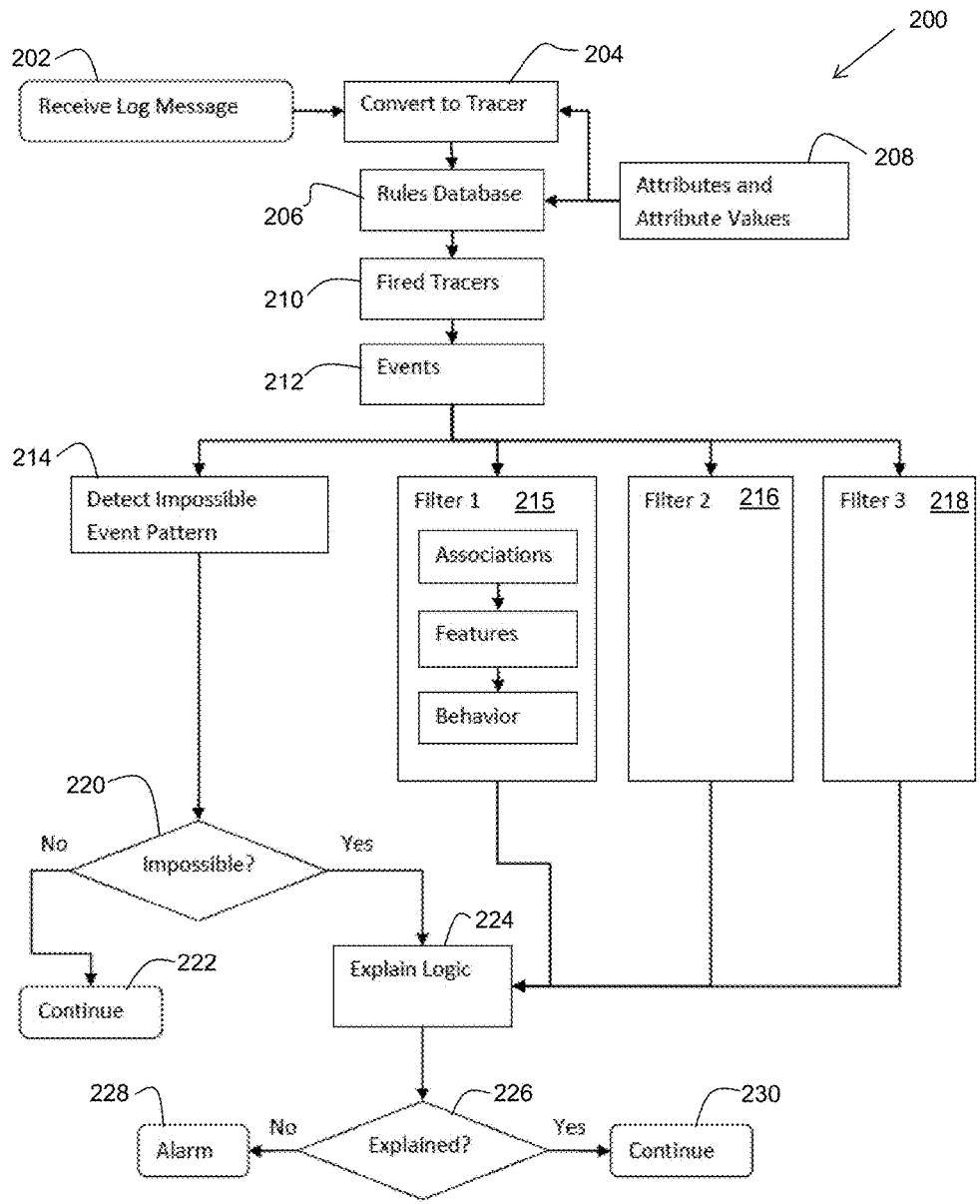
FIG. 2 illustrates one embodiment of a method, which can be performed by the misuse detection logic of the computer system of FIG. 1, to provide data-driven user authentication misuse detection.

FIG. 2 illustrates one embodiment of a method 200, which can be performed by misuse detection logic 110 of the computer system 100 of FIG. 1, to provide data-driven user authentication misuse detection. Method 200 describes operations of misuse detection logic 110 and is implemented to be performed by misuse detection logic 110 of FIG. 1, or by a computing device configured with an algorithm of the method 200. For example, in one embodiment, method 200 is implemented by a computing device 105 configured to execute a computer application. The computer application is configured to process data in electronic form and includes stored executable instructions that perform the functions of method 200.

Method 200 will be described from the perspective that users attempt to login to the computer system 100 of FIG. 1 to be authenticated to access user accounts. Some attempts are illegitimate or malicious and method 200 acts to detect such attempts. Method 200 does not require any training (labeled) data or knowledge of exact mechanisms used for user authentication misuse. Referring to FIG. 1 and FIG. 2, for each of recent multiple user authentication attempts to the computing device 105 by a user via user authentication log messages, user authentication log data having user attribute values is collected from the log messages at block 202. In accordance with one embodiment, message parsing logic 130 of FIG. 1 is configured to receive and collect the user authentication log data.

Also, for each of the recent multiple user authentication attempts, the user authentication log data is transformed into a tracer data structure having the user attribute values organized in a common format at block 204. The common format of the tracer data structure includes each of the attribute values paired with a corresponding attribute type. In accordance with one embodiment, the user authentication log data is transformed by message parsing logic 130 of FIG. 1, at least in part, by parsing the user authentication log data into the user attribute values and pairing each attribute value with a corresponding attribute type.

Furthermore, for each of the multiple user authentication attempts, an attempt is made to match the tracer data structure with an existing tracer data structure stored in the rules database device 190 at blocks 206 and 208. When a match occurs, a list of timestamps for the existing tracer data structure is updated with a new timestamp. The list of timestamps represents firing times (as data) at which the user authentication log data is observed by the computing device 105. When a match does not occur, the tracer data structure is stored as a new tracer data structure in the rules database device 190 and a novelty flag and a first timestamp associated with the new tracer data structure are set. In accordance with one embodiment, tracer matching is performed by tracer matching logic 140 of FIG. 1.

Whether or not a match occurs, for each of the recent multiple user authentication attempts, the tracer data structure is augmented with the corresponding timestamp data to generate an event data structure at blocks 210 and 212, representing a recent event. Again, the timestamp data represents a firing time at which the user authentication log data is observed by the computing device 105 (e.g., by message parsing logic 130). In accordance with one embodiment, an event data structure is generated by tracer matching logic 140 of FIG. 1.

Figure 3:
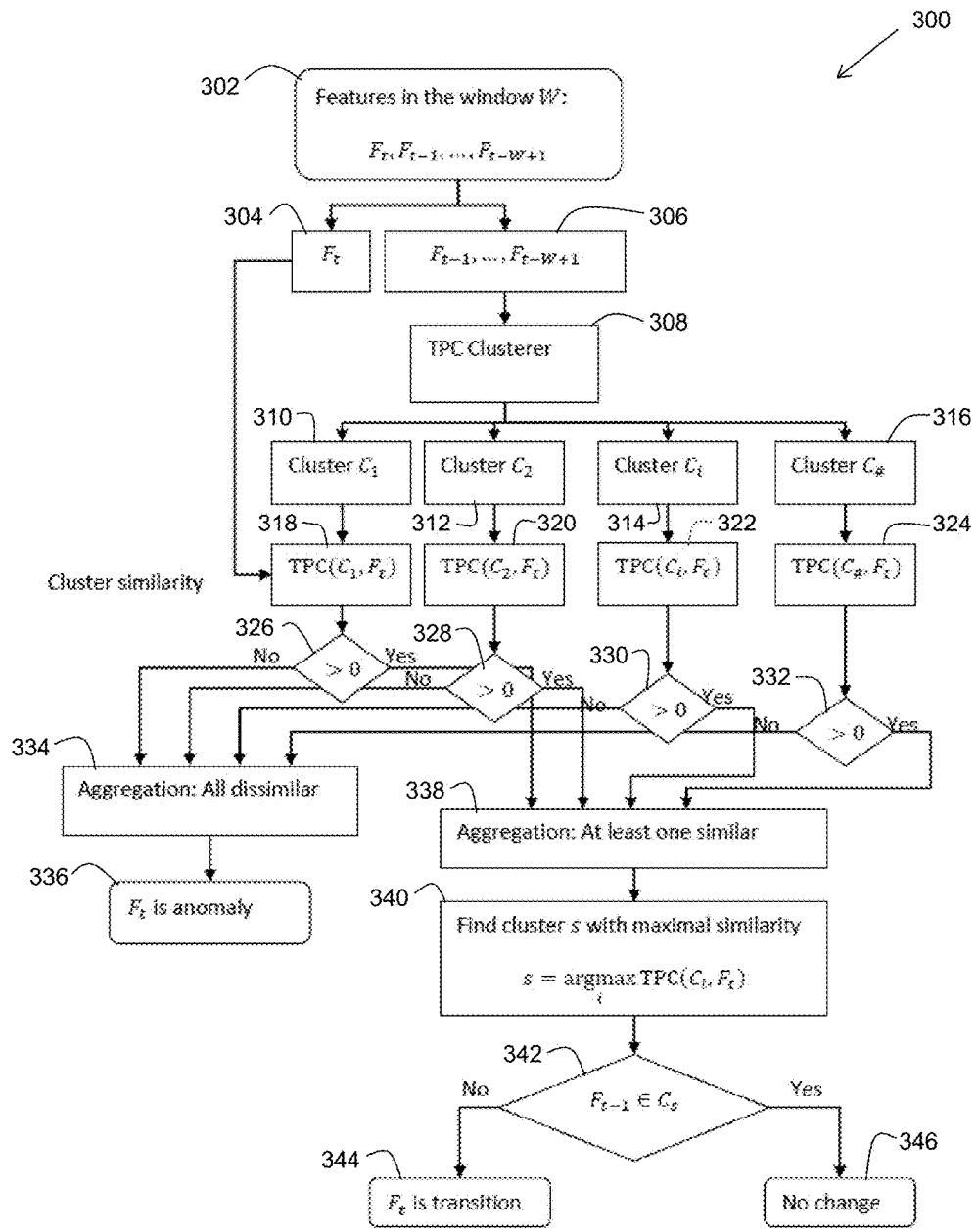
FIG. 3 illustrates one embodiment of a user behavior model, which can be used in the misuse detection logic of the computer system of FIG. 1, to detect changes in a user's authentication behavior.

Once the event data structures representing the recent authentication attempts are generated at blocks 210 and 212, the event data structures are analyzed by a first filter at block 215 representing a user behavior model (see filter 300 FIG. 3). The first filter at block 215 represents account usage patterns of a user and, in accordance with one embodiment, is implemented as part of filter logic 160 in FIG. 1. One embodiment 300 of the first filter at block 215 is discussed in detail herein with respect to FIG. 3.

In accordance with one embodiment, the user behavior model of the first filter at block 215 may be initially generated by transforming an original set of event data structures, derived from an original set of authentication attempts by the user, into features that describe authentication behavior characteristics of the user (see FIG. 3). The user behavior model may be initially generated without having to train the user behavior model using truth-labeled training data, and without having apriori knowledge of user authentication misuse.

Upon receiving the event data structures from block 212 corresponding to the recent authentication attempts, the first filter at block 215 may be updated based on the analysis of the event data structures to update the accounts usage patterns of the user as reflected in the event data structures. Also, the first filter at block 215 may be used to analyze the event data structures to determine whether the recent authentication attempts represent a deviation from expected account usage patterns of the user (i.e., to detect an anomaly).

Other filters may be provided as well (e.g., a second filter at block 216 and a third filter at block 218) which are configured to analyze the event data structures from block 212. Such other filters may include embodiments of the filters discussed previously herein with respect to FIG. 1, including a novelty filter and a blacklist filter, for example. In accordance with one embodiment, user specification of filter parameters and thresholds associated with the filters may be provided via a graphical user interface or an application program interface.

In addition to being analyzed by the filters at blocks 215, 216, and 218, in the method 200, the event data structures representing the authentication attempts that are generated at blocks 210 and 212 are also analyzed at blocks 214 and 220 to determine if an impossible event pattern exists within the authentication log messages. In accordance with one embodiment, the impossible event pattern is a hypersonic travel pattern. As discussed previously herein with respect to FIG. 1, a hypersonic travel pattern indicates that a speed of travel of a user (e.g., a malicious user), to physically authenticate from distant geographical locations, is greater than the speed of sound through air. Other impossible event patterns are possible as well, in accordance with other embodiments. In one embodiment, impossible event logic 150 of FIG. 1 is configured to detect an impossible event pattern in a sequence of event data structures.

When an impossible event pattern is not detected, the method 200 proceeds to block 222, where the method continues to monitor and analyze received authentication log messages as previously described herein. When an impossible event pattern is detected (e.g., a hypersonic travel pattern), the method 200 proceeds to block 224 and attempts to explain the impossible event pattern.

An impossible event pattern may be explained at block 224 by engaging one or more of the filters, for example, at blocks 215, 216, and 218. Attempts to explain a detected impossible event pattern have been previously discussed herein with respect to FIG. 1. For example, in one embodiment, explain logic 170 of FIG. 1 engages filter logic 160 of FIG. 1 when impossible event logic 150 of FIG. 1 detects an impossible event pattern.

At block 226, when an impossible event pattern has been explained at block 224, then the method 200 proceeds from block 226 to block 230 where the method continues to monitor and analyze received authentication log messages as previously described herein. However, when an impossible event pattern cannot be explained at block 224, then the method 200 proceeds from block 226 to block 228 and generates an alarm message or signal. The alarm message or signal indicates that a malicious authentication attempt may have been detected and that further investigation is warranted.

In this manner, the method 200 of FIG. 2 may be implemented on misuse detection logic 110 of the computer system 100 of FIG. 1 to detect instances of misuse by authorized or unauthorized users, in accordance with one embodiment. The method 200 is able to accommodate authentication attempts by many users and reliably detect malicious authentication attempts, providing a low false alarm rate.

FIG. 3 illustrates one embodiment of a user behavior model filter 300 (e.g., a user behavioral change and anomaly detection filter) which can be used in the misuse detection logic 110 of the computer system 100 of FIG. 1 to detect changes in a user's authentication behavior. In one embodiment, the user behavior model filter 300 is implemented at block 215 of the method 200 of FIG. 2.

In one embodiment, original authentication events Et are transformed into features (at block 302) that describe various characteristics of a user's authentication behavior. The feature transformation produces a feature stream $F_1, F_2, \ldots, F_t$, where each feature $F_t$ is a m-vector with values in $R^m$, $F_t = (f_{1t}, f_{2t}, \ldots, f_{mt})$. Each feature can be computed based on a single event or based on a group of events.

For example, one of the features corresponds to a login success rate which is the fraction of login attempts that were successful (or successful from the first attempt). Such a feature would have a single value (m=1). Another feature can be the association strength among various attributes or same attribute (auto-association). For example, a strong association among "client IP" and "resource name" can indicate an existing user's preference to access certain resources from certain devices or locations. Such a feature is an m-vector with m equal to the number of all 2-way, 3-way, . . . , k-way associations. Each user possesses a specific set of values for such features. By observing features over time, the system builds a comprehensive model of user authentication behavior.

In one embodiment, the strength of association among different attributes is used as the behavioral features. Such a choice is motivated by the fact that association among attributes uniquely characterizes a specific user. Even if an attacker knows a user's credentials and resources to access, they have no knowledge of the user's habits of accessing certain resources from certain IPs and at certain times or in a certain sequence. For this, the attacker needs access to the user's authentication history, which is impossible for an attacker to obtain in most situations.

More precisely, given k attributes $a_1, a_2, \ldots, a_k$ there are $$\binom{k}{2}$$

two-way associations, $$\binom{k}{3}$$

three-way associations, etc. For k=3 the feature vector is 4-dimensional with three (3) two-way associations and one (1) three-way association: $F_t=[A_t(a_1, a_2), A_t(a_1, a_3), A_t(a_2, a_3), A_t(a_1, a_2, a_3)]$. If the number of attributes is large, the number of possible associations is very large. A feature selection method can be used to select only strong associations for the feature vector. In one embodiment, the low rank associations such as two-way and three-way are used because the low rank associations are strong. High rank associations, such as, for example, ten-way associations, are weak and are less reliable for behavior modeling. However, if there is credible prior information about a discriminative significance of a specific multi-way association, it may also be used in the feature vector.

Associations are computed using a sliding window of variable length in time but fixed size in number of events. The length of the window equals the number of events sufficient for the associations to be statistically significant if they exist. Specifically, in one embodiment, the window size is selected to be:

W=min(N), such that $M_s\{N, k\}\leq 0.01$,
where $M_s\{N, k\}=\lambda[(\lambda-1)/\lambda]^N$ and $\lambda=\Pi_{i=1}^{k}|Di|$, where k is the number of attributes, and $D_i$ is the value domain of attribute $a_i$.

Association is computed as the ratio of the unique combinations of attributes observed in the window divided by the number of all possible attributes combinations.

$$A_t(a_i, a_j) = 1 - \frac{|Wt[\text{observed combinations}]|}{|\text{all possible combinations of values } ai \text{ and } aj|}$$

If the user uses (e.g.) ten (10) different IPs to access ten (10) different resources, and in a time window it is observed that the user used every IP to access every resource, then there is obviously no association between these two attributes, $A_t(a_i, a_j)=0$ (i.e., it is impossible to conclude that if a user uses a specific IP then the user most likely is going to access a specific resource). However, if the user uses certain IPs to access certain resources (e.g., accessing certain applications from home and other applications from the office), then there is an existing association, $A_t(a_i, a_j)>0$, that reflects the user's preference or habit to access certain resources from certain IPs or devices or locations. The set of associations and their interplay is a unique fingerprint of a user's authentication behavior, which is impossible to reproduce intentionally by an attacker without detailed knowledge of the user's historical authentication behavior.

In a variation, the association strength can be computed as the ratio of the number of the combinations observed in the window divided by the number of possible combinations of values observed in the window.

$$A_t(a_i, a_j) = 1 - \frac{|Wt[\text{observed combinations}]|}{|Wt[Di]||Wt[Dj]|},$$

where "$W_t[D_i]$ subset $D_i$" denotes a subset of values from $D_i$ observed in the given window $W_t=(E_t, E_{t-1}, \ldots, E_{t-w})$ and $|W_t[D_i]|$ is the number of elements in the subset.

Such a variant of association strength addresses the problem that may arise from a large number of possible values of a certain attribute such as client IP and the fact that over time a user may use a certain subset of values and then never use it again. This problem arises due to the nature of attributes such as dynamic and mobile assigned IPs for which the subset of IPs may change completely over time without a change in user behavior.

There are other ways to compute association strength using weighting, smoothing, or other techniques, in accordance with other embodiments. There are other features that may possess similar desirable properties to represent individual user characteristics impossible to reproduce intentionally by an attacker, in accordance with other embodiments.

The system further determines if the current feature vector $F_t$ is anomalous compared to the previous values of the features based on clustering (at blocks 306 to 332). In one embodiment, clustering techniques (e.g., tri-point data clustering techniques referred to as TPC herein) found in U.S. Pat. No. 9,147,167 and U.S. published patent application US20140280146 may be used (at blocks 318 to 324). U.S. Pat. No. 9,147,167 and U.S. published patent application US20140280146 are both incorporated herein by reference in their entirety.

The clustering techniques found in U.S. Pat. No. 9,147,167 and U.S. published patent application US2014028014 have the advantage of determining the number of clusters automatically. All features until time t are clustered by TPC to produce clusters denoted as $C_1, C_2, C_3$, etc, (at blocks 310 to 316). The current feature vector $F_t$ (at block 304) is tested against these clusters (at blocks 318 to 332). If Ft belongs to one of the clusters $C(F_n)=C_z$ and $F_{t-1}$ belongs to the same cluster, then no change in behavior is detected (at blocks 338, 340, 342, and 346). If $F_t$ belongs to one of the clusters $C_z$, and $F_{t-1}$ is not $\in C_z$ (i.e., $F_t$ and $F_{t-1}$ belong to different clusters), then a transition or change in behavior is detected (at block 338, 340, 342, and 344). Notice that in one embodiment, z=s, where s=argmax$_i$ TPC($C_i$, $F_t$) (at block 440) and TPC is the similarity computed as described in U.S. Pat. No. 9,147,167 and U.S. published patent application US20140280146. In a variation, z can be any cluster for which the similarity TPC($C_z$, $F_t$)>0 is positive. If $F_t$ does not belong to any clusters, then an anomaly is detected (at blocks 334 and 336).

Notice that many clustering techniques assign a cluster to any data point (a feature vector in this application). For example, k-means clustering will assign a cluster to any point. The point will be assigned to the cluster with the closest center so that an additional test is required to determine if the point is sufficiently far from all the cluster centers to be anomalous. The distance from the cluster centers is another configurable user parameter.

TPC performs cluster assignment by evaluating the similarity of the data point to each cluster. If the point is not similar to any of the clusters, it is an anomaly. If the point is similar to several clusters, the data point is assigned to the cluster with the highest similarity. The advantage of this approach compared to the prior art is that training data is not needed and user behavior does not need to be labeled as normal or anomalous. The behavior change and anomaly is provided as a service without the need for training data with behavior labeled as normal or anomalous as required by the prior art.

Because it is impossible to label a detected user anomaly as a malicious attempt or a legitimate change in user behavior without feedback from additional challenges, approaches based on training from known malicious behavior are impractical due to the limited number of known anomalies that can be identified and will miss previously unseen security threats. The disclosed method herein detects both previously seen and unseen security threats as it is not based on learning previously known patterns of normal or anomalous behavior.

In this manner, a user behavior model filter can be generated and used to detect changes in a user's authentication behavior in a vicinity of the events of interest.

Figure 4:
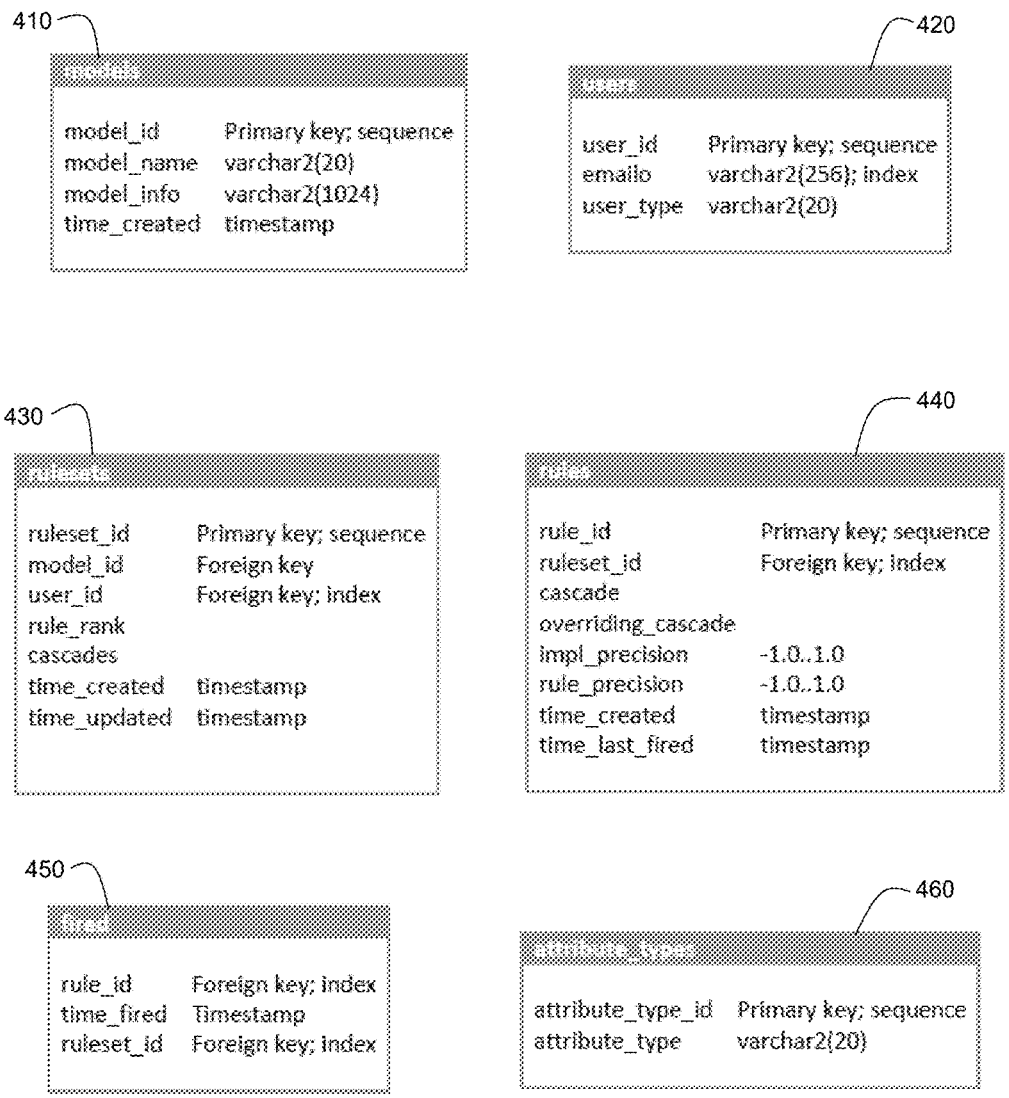
FIGS. 4 and 5 illustrate example embodiments of tables used in a rules database implementation of the computer system of FIG. 1.
Figure 5:
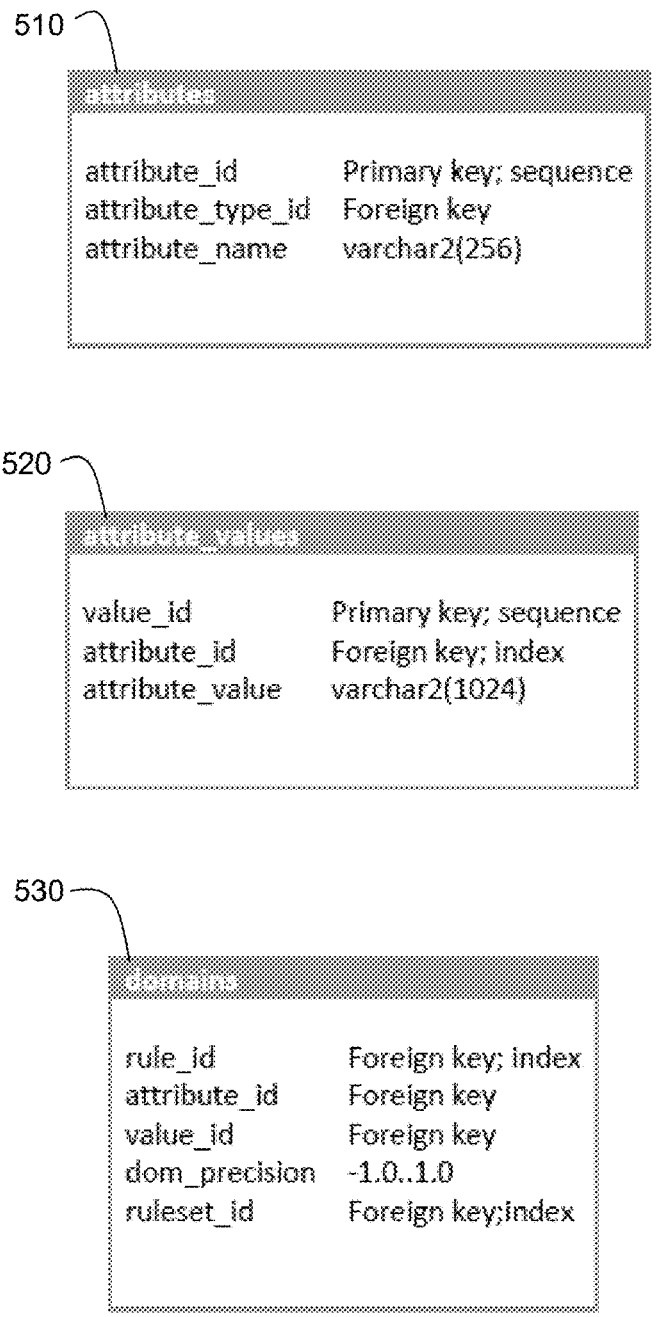

FIGS. 4 and 5 illustrate example embodiments of tables used in a rules database implementation of the rules database device 190 of the computer system 100 of FIG. 1. Table 410 is a models table that is configured to keep track of multiple models than can co-exist in the rules database (e.g., different versions of models, or models covering different time ranges, or models customized for specific user groups or use cases, including some demo models).

Table 420 is a users table that is configured to maintain user types and emails. User types may include internal, external, partner, customer, etc. Table 430 is a rulesets table that is configured to relate a ruleset to a model via model_id and to a user via user_id. Table 430 also maintains the number of cascades in the ruleset as well as the creation and update times. Rule-rank specifies the rank of rules (i.e., the number of domains in the rules).

Table 440 is a rules table that is configured to contain rules. Each rule is associated with a model (ruleset) and a user and a cascade of the ruleset. Table 450 is a fired table that is configured to keep track of firing times (timestamps) of every rule for further correlation of rule firing times. Table 450 relates time_fired to a unique rule via rule_id and to a unique ruleset via ruleset_id.

Table 460 is an attribute type table that is configured to contain admissible attribute types such that attribute values can be interpreted. Table 510 is an attributes table that is configured to maintain the list of attributes used in the rules. Table 520 is an attribute values table that is configured to contain admissible values for each attribute. Table 530 is a domains table that is configured to contain domain rules. Table 530 describes each domain by an attribute_id and a value_id and maintains precision value of the domain in dom_precision. Table 530 also relates the domain to a unique rule via rule_id and to a unique ruleset via ruleset_id.

Computing Device Embodiment

Figure 6:
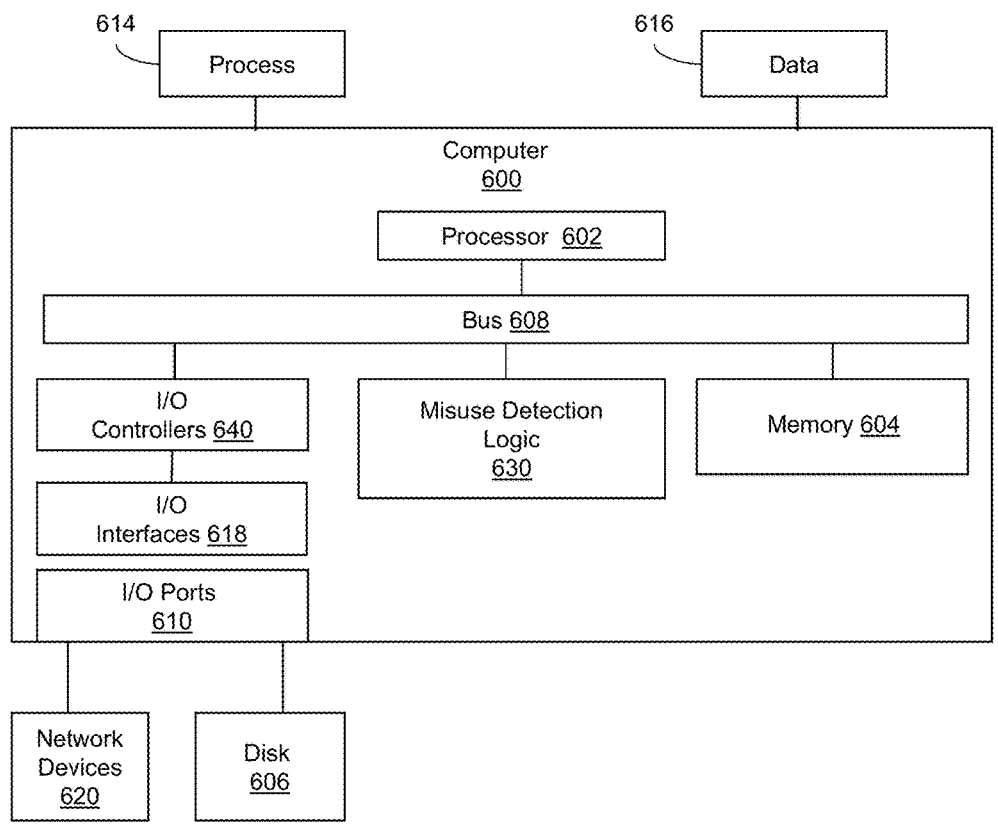
FIG. 6 illustrates one embodiment of a computing device upon which the misuse detection logic of a computing system may be implemented.

FIG. 6 illustrates an example computing device that is configured and/or programmed with one or more of the example systems and methods described herein, and/or equivalents. FIG. 6 illustrates one embodiment of a computing device upon which misuse detection logic of a computing system may be implemented. The example computing device may be a computer 600 that includes a processor 602 and a memory 604 operably connected by a bus 608.

In one example, the computer 600 may include misuse detection logic 630 (corresponding to misuse detection logic 110 from FIG. 1) which is configured to provide data-driven user authentication misuse detection. In different examples, logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, logic 630 could be implemented in the processor 602, a module stored in memory 604, or a module stored in disk 606.

In one embodiment, logic 630 or the computer 600 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the performing of data-driven user authentication misuse detection. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) to generate a user behavior model filter, representing account usage patterns of a user, based on an event data structure for each of multiple user authentication attempts to the computing device.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Systems, methods, and other embodiments have been described that are configured to provide data-driven user authentication misuse detection. In one embodiment, a computer system having a processor and a rules database device are provided. The rules database device is configured to store tracer data structures having user authentication attributes organized in a common format. The computer system includes message parsing logic configured to, for each of multiple authentication attempts to the computer system via authentication log messages, collect user authentication log data having user attribute values. Message parsing logic is also configured to, for each of the multiple authentication attempts, transform the user authentication log data into a tracer data structure having the user attribute values in the common format at least in part by parsing the user authentication log data into the user attribute values. The computer system also includes tracer matching logic configured to, for each of the multiple authentication attempts, attempt to match the tracer data structure to an existing tracer data structure stored in the rules database device. Tracer matching logic is also configured to, for each of the multiple authentication attempts, generate an event data structure by augmenting the tracer data structure with timestamp data. The timestamp data represents a time at which the user authentication log data is observed by the computer system. The computer system also includes impossible event logic configured to detect an impossible event pattern within the authentication log messages by analyzing the event data structure for each of the multiple authentication attempts. The computer system also includes filter logic configured to detect a change in behavior of a user by applying a user behavior model, representing account usage patterns of the user, to the event data structure for each of the multiple authentication attempts.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device, where the computing device includes at least a processor for executing instructions from a memory, the method comprising:

for a user authentication attempt to access a secure computer resource that results in generation of a user authentication log message, collecting, via at least the processor, user authentication log data having user attribute values;

transforming, via at least the processor, the user authentication log data into a tracer data structure having the user attribute values organized in a defined format;

augmenting, via at least the processor, the tracer data structure with timestamp data to generate an event data structure, wherein the timestamp data represents a time at which the user authentication log data is observed by the computing device;

determining, via at least the processor, whether the tracer data structure matches an existing tracer data structure stored in a rules database;

if the tracer data structure does not match the existing tracer data structure, setting a novelty flag to establish a new tracer data structure in the rules database for generating a new user behavior model filter; and if the tracer data structure matches the existing tracer data structure: (i) applying, via at least the processor, an existing user behavior model filter representing account usage patterns of the user for detecting a malicious authentication attempt to access the secure computer resource by a malicious user, (ii) controlling issuance of an alarm message or signal as a warning to a remote computing device in response to detecting the malicious authentication attempt, and (iii) updating, via at least the processor, the existing user behavior model filter based, at least in part, on the event data structure.

2. The method of claim 1, wherein transforming the user authentication log data into the tracer data structure includes parsing the user authentication log data into the user attribute values.

3. The method of claim 1, wherein the defined format of the tracer data structure includes each of the attribute values paired with a corresponding attribute type organized in a format that is common to each of a plurality of user authentication attempts to access the secure computer resource.

4. The method of claim 1, wherein if the tracer data structure matches the existing tracer data structure, a list of timestamps for the existing tracer data structure is updated with a new timestamp, wherein the list of timestamps represents a plurality of times at which the user authentication log data is observed by the computing device.

5. The method of claim 1, wherein detecting the malicious authentication attempt further includes detecting an impossible event pattern within authentication log messages received by the computing device from the malicious user.

6. The method of claim 1, wherein generating the new user behavior model filter comprises transforming the event data structure, and at least one additional event data structure derived from a second authentication attempt to access the secure computer resource, into features that describe authentication behavior characteristics of the user, without having to train the new user behavior model filter using truth-labeled training data, and without having apriori knowledge of user authentication misuse.

7. The method of claim 1, further comprising controlling user specification of filter parameters associated with at least the user behavior model filter via a graphical user interface or an application program interface.

8. The method of claim 1, wherein the user attribute values include at least one of a user name value, a client IP address value, a resource name value, a login status value, a timestamp value, an authentication scheme value, an authentication policy value, a partner value, a failure code value, a retry count value, a session value, and an authentication level value.

9. A computer system, comprising:
a processor;
a rules database device configured to store tracer data structures having user authentication attributes organized in a defined format;
a message parsing module stored in a non-transitory computer-readable medium including instructions that when executed cause the processor to, for a user authentication attempt to access a secure computer resource that results in generation of a user authentication log message:
   collect user authentication log data including user attribute values from the user authentication log message, and
   transform the user authentication log data into a tracer data structure having the user attribute values in the defined format by parsing the user authentication log data into the user attribute values;
a tracer matching module stored in the non-transitory computer-readable medium including instructions that when executed cause the processor to:
   augment the tracer data structure with timestamp data to generate an event data structure, wherein the timestamp data represents a time at which the user authentication log data is observed by the computing device;
   determine whether the tracer data structure matches an existing tracer data structure stored in a rules database;
a filter module stored in the non-transitory computer-readable medium including instructions that when executed cause the processor to:
   if the tracer data structure does not match the existing tracer data structure, set a novelty flag to establish a new tracer data structure in the rules database for generating a new user behavior model filter; and
   if the tracer data structure matches the existing tracer data structure: (i) apply an existing user behavior model filter representing account usage patterns of the user for detecting a malicious authentication attempt to access the secure computer resource by a malicious user, (ii) control issuance of an alarm message or signal as a warning to a remote computing device in response to detecting the malicious authentication attempt, and (iii) update the existing user behavior model filter based, at least in part, on the event data structure.

10. The computer system of claim 9, further comprising an explain module stored in the non-transitory computer-readable medium including instructions that when executed cause the processor to engage at least the filter module to:
   determine a valid explanation for the malicious authentication attempt and generate a corresponding valid explanation message.

11. The computer system of claim 9, wherein the user attribute values include at least one of a user name value, a client IP address value, a resource name value, a login status value, a timestamp value, an authentication scheme value, an authentication policy value, a partner value, a failure code value, a retry count value, a session value, and an authentication level value.

12. The computer system of claim 9, wherein the defined format of the tracer data structure includes each of the attribute values paired with a corresponding attribute type organized in a format that is common to each of a plurality of user authentication attempts to access the secure computer resource.

13. The computer system of claim 9, wherein the filter module further includes instructions that when executed cause the processor to detect the malicious authentication attempt based, at least in part, on an impossible event pattern within authentication log messages received by the computing device from the malicious user.

14. The computer system of claim 9, further comprising a visual user interface module stored in the non-transitory computer-readable medium including instructions that when executed cause the processor to provide a graphical user interface that controls at least user specification of filter parameters associated with the filter module.

15. The computer system of claim 14, further comprising a display screen configured to display and facilitate user interaction with at least the graphical user interface provided by the visual user interface module.

16. The computer system of claim 9, wherein the filter module includes instructions that when executed cause the processor to generate the new user behavior model filter by transforming the event data structure, and at least one additional event data structure derived from a second authentication attempt to access the secure computer resource, into features that describe authentication behavior characteristics of the user, without having to train the new user behavior model filter using truth-labeled training data, and without having apriori knowledge of user authentication misuse.

17. A non-transitory computer-readable medium storing instructions that, when executed by one or more processors of a computing device, cause the computing device to at least:
   for a user authentication attempt to access a secure computer resource that results in generation of a user authentication log message, collecting, via at least the processor, user authentication log data having user attribute values;

transforming, via at least the processor, the user authentication log data into a tracer data structure having the user attribute values organized in a defined format;

augmenting, via at least the processor, the tracer data structure with timestamp data to generate an event data structure, wherein the timestamp data represents a time at which the user authentication log data is observed by the computing device;

determining, via at least the processor, whether the tracer data structure matches an existing tracer data structure stored in a rules database;

if the tracer data structure does not match the existing tracer data structure, setting a novelty flag to establish a new tracer data structure in the rules database for generating a new user behavior model filter; and if the tracer data structure matches the existing tracer data structure: (i) applying, via at least the processor, an existing user behavior model filter representing account usage patterns of the user for detecting a malicious authentication attempt to access the secure computer resource by a malicious user, (ii) controlling issuance of an alarm message or signal as a warning to a remote computing device in response to detecting the malicious authentication attempt, and (iii) updating, via at least the processor, the existing user behavior model filter based, at least in part, on the event data structure.

18. The non-transitory computer-readable medium of claim 17, wherein the instructions further comprise instructions that, when executed by the one or more processors, cause the computing device to, if the tracer data structure matches the existing tracer data structure, update a list of timestamps for the existing tracer data structure with a new timestamp, wherein the list of timestamps represents a plurality of times when the user authentication log data was previously observed by the computing device.

19. The non-transitory computer-readable medium of claim 17, wherein the instructions further include instructions that, when executed by the one or more processors, causes the computing device to:

determine a valid explanation for the malicious authentication attempt and generate a corresponding valid explanation message.

20. The non-transitory computer-readable medium of claim 17, wherein the instructions further comprise instructions that, when executed by the one or more processors, cause the computing device to at least generate the new user behavior model filter, at least in part, by transforming the event data structure, and at least one additional event data structure derived from a second authentication attempt to access the secure computer resource, into features that describe authentication behavior characteristics of the user, without having to train the new user behavior model filter using truth-labeled training data, and without having apriori knowledge of user authentication misuse.

* * * * *